United States Patent
Hsu et al.

(10) Patent No.: US 12,404,959 B1
(45) Date of Patent: Sep. 2, 2025

(54) FLOATING JOINT AND RETAINER CONNECTION DEVICE WITH PRESSURE RELIEF STRUCTURE

(71) Applicant: FOSITEK CORPORATION, New Taipei (TW)

(72) Inventors: An-Szu Hsu, New Taipei (TW); Chun-Han Lin, New Taipei (TW); Yung-Chih Tseng, New Taipei (TW); Hao-Yun Lee, New Taipei (TW)

(73) Assignee: FOSITEK CORPORATION, New Taipei (TW)

( * ) Notice: Subject to any disclaimer, the term of this patent is extended or adjusted under 35 U.S.C. 154(b) by 0 days.

(21) Appl. No.: 18/797,918

(22) Filed: Aug. 8, 2024

(30) Foreign Application Priority Data

Jul. 29, 2024 (TW) .................................. 113128160

(51) Int. Cl.
*F16L 27/12* (2006.01)

(52) U.S. Cl.
CPC .................................... *F16L 27/12* (2013.01)

(58) Field of Classification Search
CPC ....... F16L 27/12; F16L 27/1273; F16L 27/26; F16L 27/02; F16L 5/025; F16L 41/18
See application file for complete search history.

(56) References Cited

U.S. PATENT DOCUMENTS

| | | | |
|---|---|---|---|
| 4,615,546 A * | 10/1986 | Nash | F16L 37/23 |
| 11,788,661 B2 * | 10/2023 | Hsieh | F16L 37/42 |

FOREIGN PATENT DOCUMENTS

| | | | |
|---|---|---|---|
| CN | 107300077 A | * | 10/2017 |
| CN | 209084213 U | | 7/2019 |
| CN | 209977512 U | | 1/2020 |
| TW | M662188 U | | 10/2024 |

OTHER PUBLICATIONS

Search Report dated Mar. 4, 2025 issued by Taiwan Intellectual Property Office for counterpart application No. 113128160.

* cited by examiner

*Primary Examiner* — Zachary T Dragicevich
(74) *Attorney, Agent, or Firm* — Demian K. Jackson; Jackson IPG PLLC

(57) ABSTRACT

A floating joint and retainer connection device with pressure relief structure includes a hollow fixed retainer; an adaptor joint having an engaging end and a fitting end extended through the fixed retainer to an outer side thereof, and a buffering section located between the engaging and fitting ends; a slidable washer and a fixing element fitted on an outer surface of the fitting end to limit the adaptor joint from moving axially relative to the fixed retainer; an elastic element located between the fixed retainer and the slidable washer; a slidable spacer having an axially protruded section formed on one side; and a spring fitted around the buffering section with two ends pressed against another side of the abutting spacer and a shoulder portion on the adaptor joint. With the above pressure relief structure, the adaptor joint can stay at any radially displaced position relative to the fixed retainer.

5 Claims, 5 Drawing Sheets

FLOATING JOINT AND RETAINER CONNECTION DEVICE WITH PRESSURE RELIEF STRUCTURE This application claims the priority benefit of Taiwan patent application number 113128160 filed on Jul. 29, 2024, the disclosure of which is hereby incorporated by reference in its entirety.

FIELD OF THE INVENTION

The present invention relates to a floating joint and retainer connection device, and more particularly, to a floating joint and retainer connection device with pressure relief structure capable of reducing a radially sliding resistance of a floating joint thereof.

BACKGROUND OF THE INVENTION

In each server cabinet, there is mounted a plurality of servers, and the distance left between any two adjacent servers is relatively small. Further, the current server is internally provided with one or more executing units or the arithmetic logic units. These units have highly upgraded computing performance and will produce a very large amount of heat during operation thereof. The huge amount of heat could not be effectively dissipated from the server simply by air cooling thermal modules. Therefore, there are manufacturers who try to remove the heat from the servers in the server cabinet by water cooling. In consideration of the precision electronic parts in the servers, it is necessary to prevent all pipe joints in the water cooling system from leaking, so as to protect the electronic parts from possible damages caused by water leaking. For this purpose, most of the pipes for the water cooling system of the servers are made of hard or metal materials. And, a male and a female quick coupler are correspondingly provided on the server (i.e. a movable side) and the server cabinet (i.e. a fixed side) to enable quick connection or disconnection of the water pipes provided on the movable side and the fixed side, respectively. Usually, a small radial tolerance would exist between the water cooling pipes mounted on the server and the server cabinet, and it is necessary to correct the radial tolerance quickly. For this purpose, at least one guide stem is provided on the fixed side (the server cabinet) near a position having the female coupler mounted thereto and a guide block internally defining a guiding bore is provided on the movable side (the server) near a position having the male coupler mounted thereto to correspond to the guide stem. To assemble the male and the female coupler to each other, first insert the guide stem into the guiding bore in the guide block. Through guiding of the guide stem and the guide block, the two quick couplers initially having a radial tolerance between them are guided to an almost concentric position, so that the two quick couplers can be serially connected end to end.

There are other manufacturers who omit the guide stem and the guide block to save the space in the server cabinet. For this purpose, a fixed retainer and an adaptor joint for correcting the radial offset are provided on the female coupler and the male coupler, respectively, and a beveled surface is provided in the guiding bore of the female coupler at a position that contacts with the adaptor joint first when the female coupler is connected to the male coupler end to end. When connecting the female and the male coupler, the adaptor joint can be displaced radially relative to the fixed retainer to correct the radial offset of the male coupler from the female coupler. And, two washers are used to clamp the adaptor joint to the fixed retainer by applying a normal force to the adaptor joint and the fixed retainer, so that the adaptor joint can stay at a fixed position after it is displaced radially relative to the fixed retainer. However, when the normal force applied by the two washers to the fixed retainer is too large, the adaptor joint will be stopped by a large resistance from displacing smoothly. On the other hand, when the normal force applied by the two washers is too small, the adaptor joint would not be able to stay at a desired final position after it is displaced radially. It is therefore an important goal of the manufacturing field to overcome the above-mentioned problems.

SUMMARY OF THE INVENTION

To effectively solve the above problems, a primary object of the present invention is to provide a floating joint and retainer connection device with pressure relief structure capable of reducing a radially sliding resistance of an adaptor joint, so as to effectively control a normal force for the adaptor joint to displace relative to the fixed retainer and reduce a resistance between the adaptor joint and the fixed joint when the adaptor joint is displaced radially relative to the fixed joint, and effectively control the adaptor joint to stay at a final position after it is displaced radially relative to the fixed joint.

To achieve the above and other objects, the floating joint and retainer connection device with pressure relief structure according to the present invention includes a fixed retainer, an adaptor joint, a slidable washer, an elastic element, a fixing element, an abutting spacer, and a spring.

The fixed retainer has a first side and a second side located opposite to each other and internally defines a receiving space located between the first and the second side; the first side is an open side and the second side is a closed side provided with a through hole; and the through hole is communicable with the receiving space. The adapter joint has an engaging end and a fitting end, and includes a buffering section located and extended between the engaging end and the fitting end; the fitting end of the adaptor joint is extended into the receiving space of the fixed retainer to project outward from the through hole; and a shoulder portion is formed at a junction of the engaging end and the buffering section. The slidable washer and the elastic element are fitted around the outer surface of the fitting end of the adaptor joint, and the elastic element is located between the second side of the fixed retainer and the slidable washer. The fixing element is fitted on the outer surface of the fitting end of the adaptor joint for limiting the adaptor joint from moving axially relative to the fixed retainer but allowing the adaptor joint to displace radially relative to the fixed retainer. The abutting spacer is fitted on around the buffering section of the adaptor joint and has one side formed into an axially protruded section for abutting against the slidable washer. The spring is fitted on an outer surface of the buffering section with two ends pressing against one side of the abutting spacer and the shoulder portion of the adaptor joint, respectively.

With the floating joint and retainer connection device with pressure relief structure according to the present invention, a normal force between the adaptor joint and the fixed retainer can be effectively controlled to reduce the resistance between the adaptor joint and the fixed retainer when the adaptor joint is displaced radially relative to the fixed retainer, and to ensure the adaptor joint can stay at a final position after it is radially displaced relative to the fixed retainer.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

The present invention will now be described with some preferred embodiments thereof with reference to the accompanying drawings.

Figure 1:
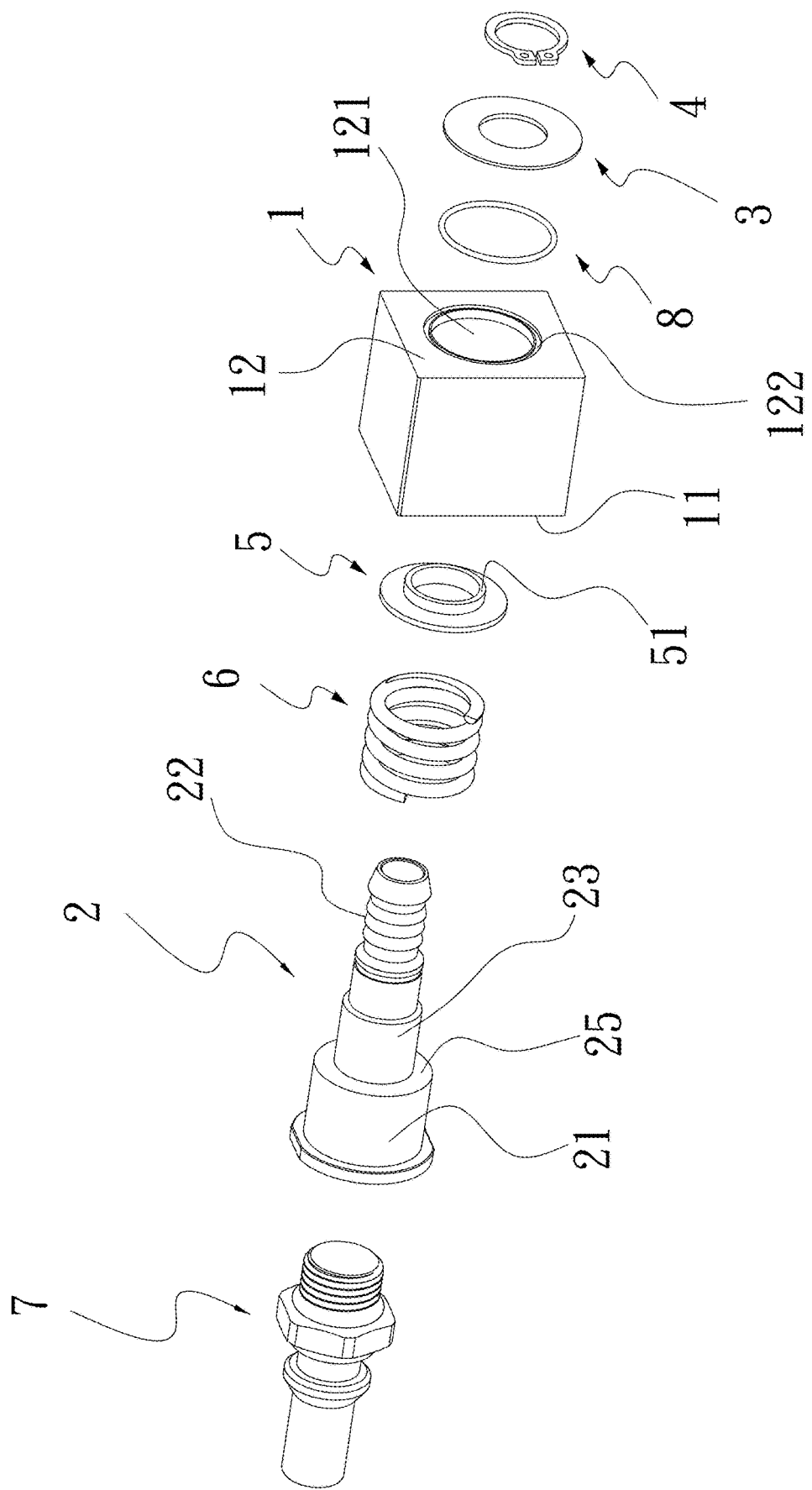
FIG. 1 is an exploded perspective view of a floating joint and retainer connection device with pressure relief structure according to a first embodiment of the present invention.
Figure 2:
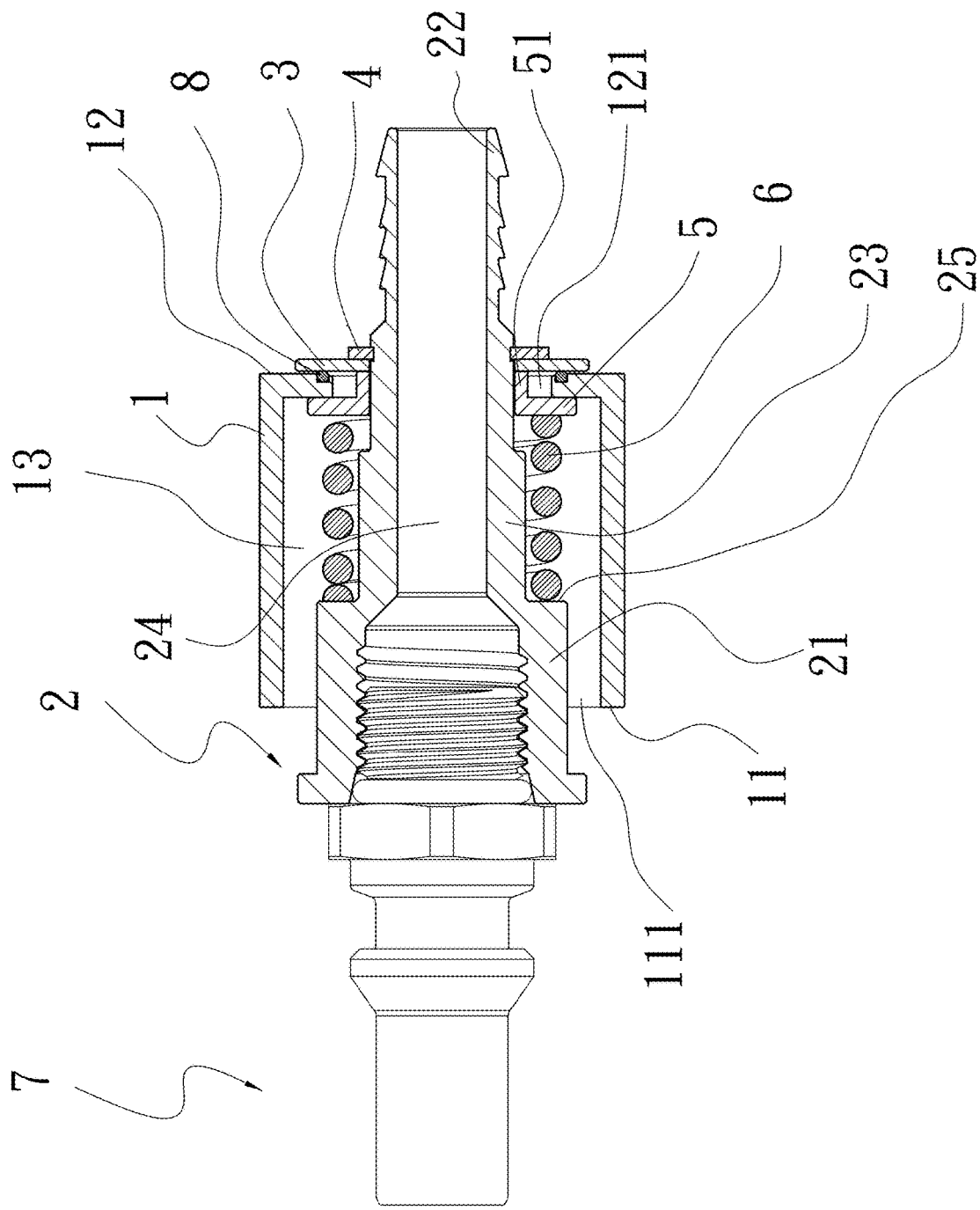
FIG. 2 is an assembled sectional view of FIG. 1.
Figure 3A:
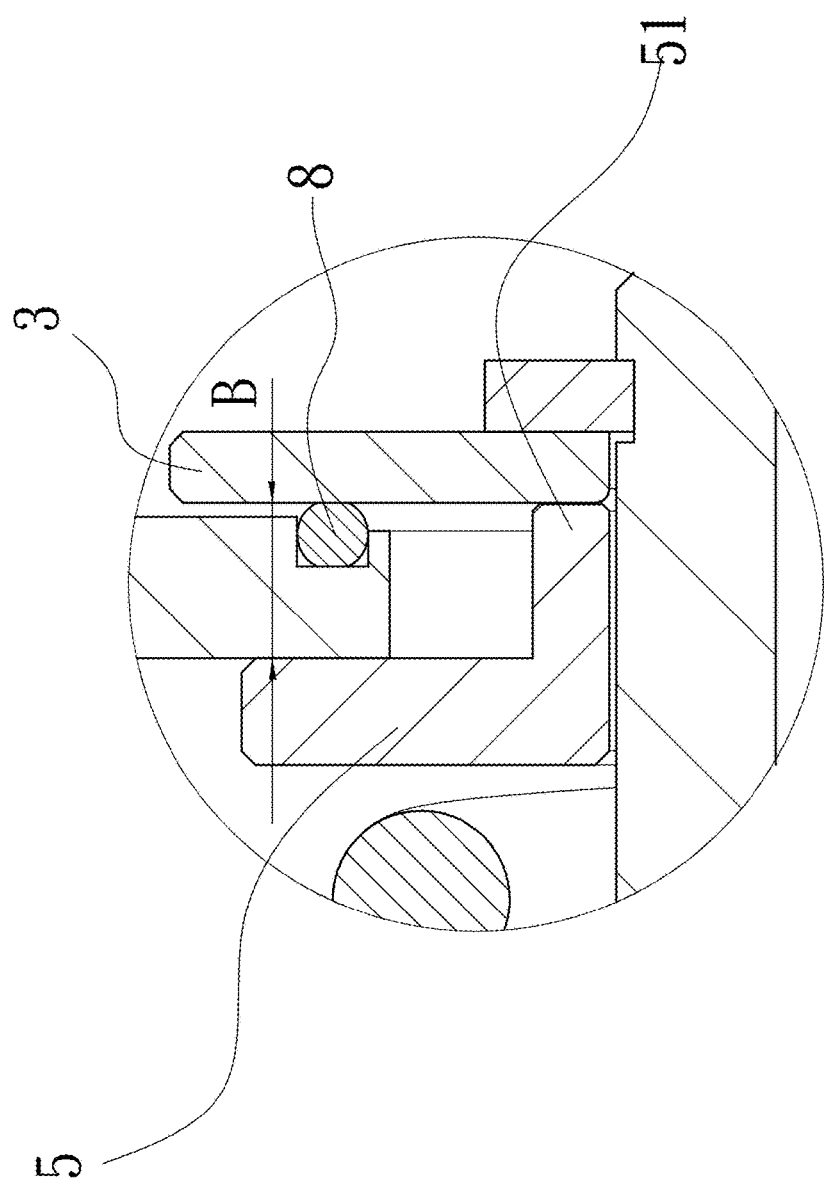
FIG. 3A is a fragmentary, enlarged sectional view of the present invention, of which an abutting spacer includes an axially protruded section integrally formed therewith.
Figure 3B:
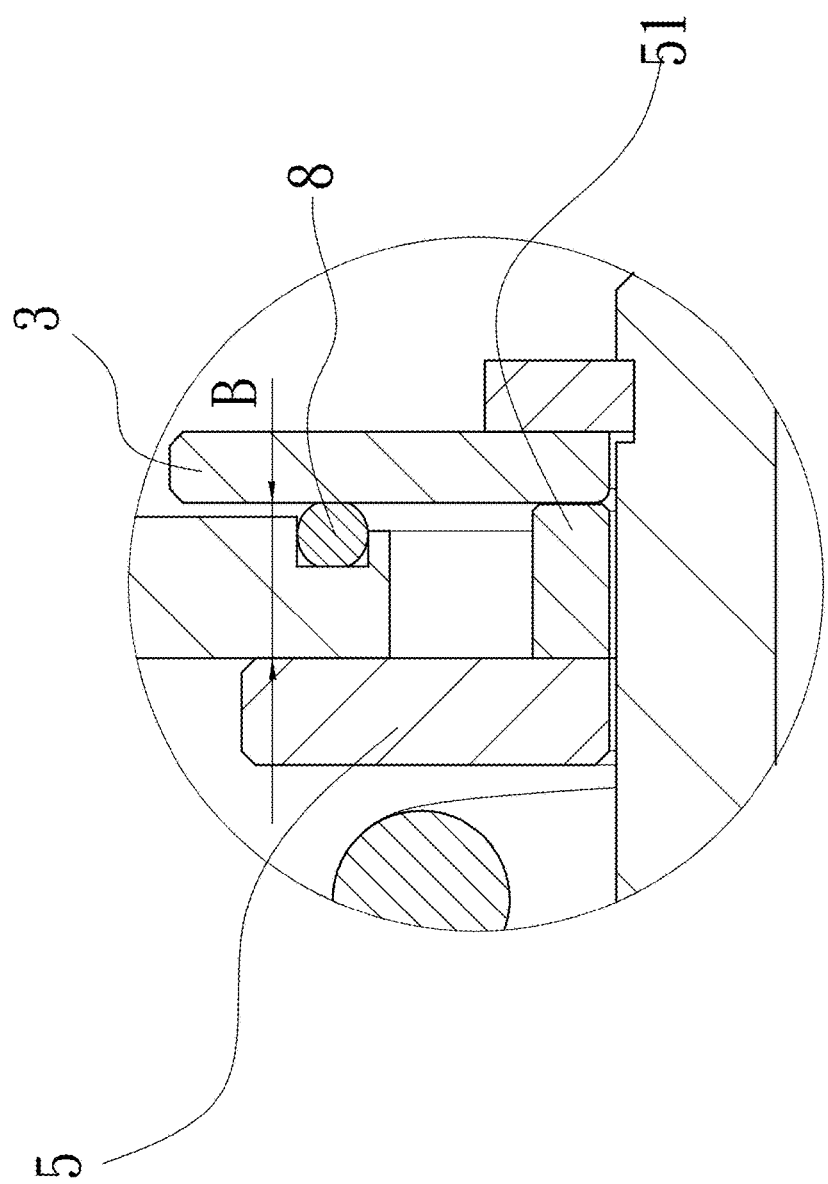
FIG. 3B is another fragmentary, enlarged sectional view of the present invention, of which the abutting spacer includes an axially protruded section non-integrally formed therewith.

Please refer to FIGS. 1 and 2, which are exploded perspective view and assembled sectional view, respectively, of a floating joint and retainer connection device with pressure relief structure according to a first embodiment of the present invention; and to FIGS. 3A and 3B, which are fragmentary sectional views showing two differently formed abutting spacers included in the present invention. As shown, the floating joint and retainer connection device with pressure relief structure includes a fixed retainer 1, an adaptor joint 2, a slidable washer 3, a fixing element 4, an abutting spacer 5, a spring 6, and an elastic element 8.

The fixed retainer 1 has a first side 11 and a second side 12 located opposite to each other, and internally defines a receiving space 13 located between the first side 11 and the second side 12. The first side 11 is an open side defining a penetrating opening 111 communicating with the receiving space 13; and the second side 12 is a closed side provided with a through hole 121, which is communicable with the receiving space 13.

The adaptor joint 2 has two opposite ends, namely, an engaging end 21 and a fitting end 22, and includes a buffering section 23 located and extended between the engaging end 21 and the fitting end 22. The adaptor joint 2 internally defines a passage 24 communicating with the engaging end 21 and the fitting end 22. The fitting end 22 of the adaptor joint 2 is extended into the receiving space 13 of the fixed retainer 1 to project to an outer side of the fixed retainer 1 via the through hole 121. A shoulder portion 25 is formed at a junction of the engaging end 21 and the buffering section 23, and the through hole 121 has an inner diameter larger than an outer diameter of the fitting end 22.

The engaging end 21 of the adaptor joint 2 is connectable with a male coupler 7 end to end, or is connectable with a pipe or other structure or member. Or alternatively, the engaging end 21 may have an additional structure extended therefrom for connecting with another member.

The slidable washer 3 is fitted on an outer surface of the fitting end 22 of the adaptor joint 2. The elastic element 8 is fitted around but spaced from the outer surface the fitting end 22 of the adaptor joint 2 and is located between the second side 12 of the fixed retainer 1 and the slidable washer 3. Alternatively, a groove 122 may be formed at an outer side of the second side 12 of the fixed retainer 1 for receiving the elastic element 8 therein. The elastic element 8 can be an elastic washer or a rubber ring made of an elastic material.

The fixing element 4 is fitted on the outer surface of the fitting end 22 of the adaptor joint 2 to press against the slidable washer 3, such that the adaptor joint 2 is axially limited from moving relative to the fixed retainer 1 but radially movable relative to the fixed retainer 1. The fixing element 4 can be a retaining ring or a nut or other suitable element.

The abutting spacer 5 is fitted on around the buffering section 23 of the adaptor joint 2. The abutting spacer 5 has an axially protruded section 51 formed on one side thereof to abut against one side of the slidable washer 3, such that a spacing distance B is formed between the abutting spacer 5 and the slidable washer 3.

The axially protruded section 51 may be integrally formed with the abutting spacer 5, as shown in FIG. 3A, or be additionally connected to the abutting spacer 5, as shown in FIG. 3B, without being particularly restricted according to the present invention.

The spring 6 is externally fitted around the buffering section 23 of the adaptor joint 2 with two ends thereof pressed against one side of the abutting spacer 5 opposite to the axially protruded section 51 and the shoulder portion 25 of the adaptor joint 2, respectively. The spring 6 can be axially compressed to provide an elastic stroke, so that the adaptor joint 2 allows for an axially tolerance and can be finely adjusted in an axial direction.

Figure 5:
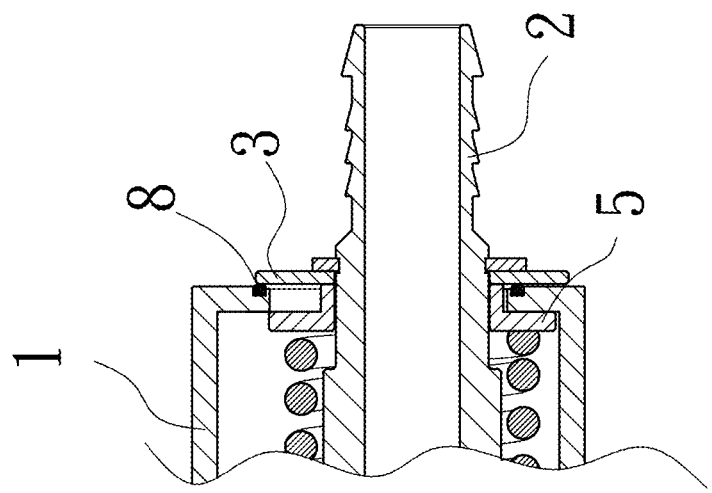
FIG. 5 is another fragmentary sectional view showing the present invention after the adaptor joint is displaced radially relative to the fixed retainer.
Figure 4:
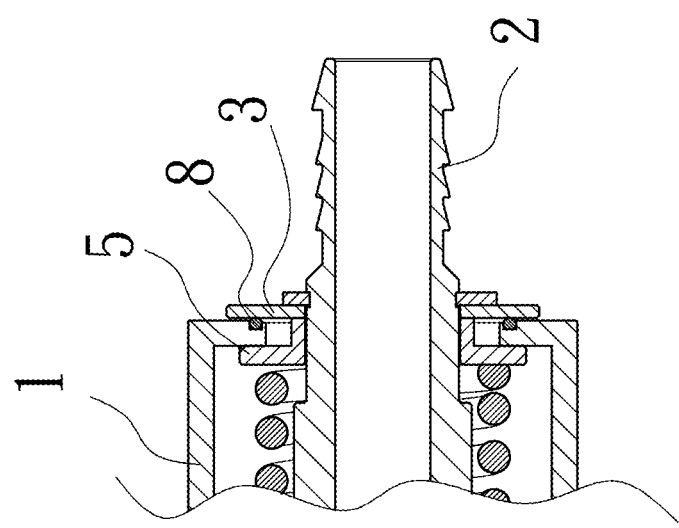
FIG. 4 is a fragmentary sectional view showing the present invention before an adaptor joint is displaced radially relative to a fixed retainer thereof.

Please refer to FIGS. 4 and 5, which show the operation of the present invention. In FIG. 4, the adaptor joint 2 is not displaced radially relative to the fixed retainer 1; and in FIG. 5, the adaptor joint 2 has been displaced radially relative to the fixed retainer 1. As shown, the axially protruded section 51 of the abutting spacer 5 is abutted against one side of the slidable washer 3 to form a spacing distance B between them. With the spacing distance B, the abutting spacer 5 and the slidable washer 3 would not too tightly clamp on inner and outer surfaces of the second side 12 of the fixed retainer 1 to cause difficulty in radial displacing of the adaptor joint 2 relative to the fixed retainer 1. The elastic element 8 is located between the outer surface of the second side 12 of the fixed retainer 1 and the slidable washer 3 to play the main role of controlling the normal force between the adaptor joint 2 and the fixed retainer 1. With its elastic property, the elastic element 8 provides the normal force for supporting the slidable washer 3 and the fixed retainer 1 in place and accordingly, controls the normal force or frictional force between the slidable washer 3 and the fixed retainer 1 and prevents the adaptor joint 2 from displacing radially relative to the fixed retainer 1 difficultly due to a too large frictional force between the adaptor joint 2 and the fixed retainer 1. Further, when the size of the normal force between the adaptor joint 2 and the fixed retainer 1 is controlled using the elastic element 8, the adaptor joint 2 is movable relative to the fixed retainer 1 smoothly and can be held to a final position after its radial displacement relative to the fixed retainer 1.

The primary object of the present invention is to reduce the resistance between the adaptor joint 2 and the fixed retainer 1 when they move radially relative to each other. When the slidable washer 3 and the abutting spacer 5 are spaced from each other by the axially protruded portion 51 of the abutting spacer 5, it is possible to control the frictional force for supporting the slidable washer 3 on the fixed retainer 1, lest a too large resistance should exist between the slidable washer 3 and abutting spacer 5 and the fixed retainer 1 to hinder the adaptor joint 2 from displacing radially relative to the fixed retainer 1 smoothly. On the other hand, in the case the normal force is too small or even having not the normal force, the adaptor joint 2 would fall off under the gravity or could not be held to its final position. In the present invention, the abutting spacer 5, the slidable washer 3, and the elastic element 8 cooperate with one another to control and adjust the sliding resistance between the slidable washer 3 and the fixed retainer 1, such that the adaptor joint 2 could stay at any desired position after it is displaced radially relative to the fixed retainer 1. Therefore, the present invention overcomes the shortage of the conventional structure for correcting the radial tolerance between the male and the female coupler that could not provide properly controllable normal force.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A floating joint and retainer connection device with pressure relief structure, comprising:
    a fixed retainer having a first side and a second side located opposite to each other and internally defining a receiving space located between the first and the second side; the first side being an open side and the second side being a closed side provided with a through hole; and the through hole being communicable with the receiving space;
    an adaptor joint having an engaging end and a fitting end, and including a buffering section located and extended between the engaging end and the fitting end; the fitting end of the adaptor joint being extended into the receiving space of the fixed retainer to project outward from the through hole; and the adaptor joint including a shoulder portion formed at a junction of the engaging end and the buffering section;
    a slidable washer being fitted on an outer surface of the fitting end of the adaptor joint;
    an elastic element being fitted around the outer surface of the fitting end of the adaptor joint and located between the second side of the fixed retainer and the slidable washer;
    a fixing element being fitted on the outer surface of the fitting end of the adaptor joint, such that the adaptor joint is limited from moving axially relative to the fixed retainer but radially displaceable relative to the fixed retainer;
    an abutting spacer being fitted on around the buffering section of the adaptor joint and having one side formed into an axially protruded section for abutting against the slidable washer; and
    a spring being fitted on an outer surface of the buffering section with two ends pressing against one side of the abutting spacer opposite to the axially protruded section and the shoulder portion of the adaptor joint, respectively.

2. The floating joint and retainer connection device with pressure relief structure as claimed in claim 1, wherein the fixing element is a retaining ring.

3. The floating joint and retainer connection device with pressure relief structure as claimed in claim 1, wherein the through hole on the second side of the fixed retainer has an internal diameter larger than an outer diameter of the fitting end.

4. The floating joint and retainer connection device with pressure relief structure as claimed in claim 1, wherein the first side of the fixed retainer defines a penetrating opening communicable with the receiving space.

5. The floating joint and retainer connection device with pressure relief structure as claimed in claim 1, wherein the abutting spacer and the axially protruded section are not integrally formed with each other.

* * * * *